(12) United States Patent
Uang

(10) Patent No.: US 9,346,080 B2
(45) Date of Patent: *May 24, 2016

(54) PRINTING INK COMPOSITION AND METHOD FOR PRINTING

(71) Applicant: Yuh-Jye Uang, Chesterfield, MO (US)

(72) Inventor: Yuh-Jye Uang, Chesterfield, MO (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/986,518

(22) Filed: May 10, 2013

(65) Prior Publication Data

US 2013/0251897 A1    Sep. 26, 2013

Related U.S. Application Data

(60) Continuation-in-part of application No. 12/657,302, filed on Jan. 19, 2010, now abandoned, which is a continuation-in-part of application No. 11/069,708, filed on Mar. 1, 2005, now abandoned, application No. 13/986,518, which is a division of application No. 12/456,215, filed on Jun. 12, 2009, now Pat. No. 8,557,349.

(60) Provisional application No. 60/548,990, filed on Mar. 1, 2004, provisional application No. 61/131,964, filed on Jun. 13, 2008.

(51) Int. Cl.

| | |
|---|---|
| *B05D 1/02* | (2006.01) |
| *B05D 1/32* | (2006.01) |
| *B05D 1/36* | (2006.01) |
| *B05D 1/40* | (2006.01) |
| *B05D 1/42* | (2006.01) |
| *B05D 7/00* | (2006.01) |
| *B05D 7/02* | (2006.01) |
| *B05D 7/04* | (2006.01) |
| *B05D 7/26* | (2006.01) |
| *B41M 1/12* | (2006.01) |
| *B41M 1/18* | (2006.01) |
| *B41M 1/32* | (2006.01) |
| *B41M 1/40* | (2006.01) |
| *C09D 11/033* | (2014.01) |
| *C09D 11/037* | (2014.01) |
| *C09D 11/106* | (2014.01) |
| *C09D 11/108* | (2014.01) |
| *C09D 11/50* | (2014.01) |

(52) U.S. Cl.
CPC .. *B05D 7/02* (2013.01); *B05D 1/02* (2013.01); *B05D 1/32* (2013.01); *B05D 1/36* (2013.01); *B05D 1/40* (2013.01); *B05D 1/42* (2013.01); *B05D 7/04* (2013.01); *B05D 7/26* (2013.01); *B05D 7/50* (2013.01); *B05D 7/53* (2013.01); *B41M 1/12* (2013.01); *B41M 1/18* (2013.01); *B41M 1/32* (2013.01); *B41M 1/40* (2013.01); *C09D 11/033* (2013.01); *C09D 11/037* (2013.01); *C09D 11/106* (2013.01); *C09D 11/108* (2013.01); *C09D 11/50* (2013.01); *B05D 2201/02* (2013.01); *B05D 2530/00* (2013.01); *B05D 2701/10* (2013.01)

(58) Field of Classification Search
CPC .............. B05D 1/02; B05D 1/36; B05D 1/40; B05D 1/42; B05D 7/02; B05D 7/04; B05D 7/26; B05D 7/50; B05D 7/53; B05D 2201/02; B05D 2530/00; B05D 2701/10; B05D 1/32; B41M 1/18; B41M 1/32; B41M 1/40; B41M 1/12; C09D 11/033; C09D 11/037; C09D 11/106; C09D 11/108; C09D 11/50

See application file for complete search history.

(56) References Cited

U.S. PATENT DOCUMENTS

| | | | |
|---|---|---|---|
| 3,519,466 A | 7/1970 | Akamatsu et al. | |
| 3,991,002 A | 11/1976 | Sadlo | |
| 4,472,537 A | 9/1984 | Johnson et al. | |
| 5,334,646 A | 8/1994 | Chen | |
| 5,854,306 A | 12/1998 | Mattesky et al. | |
| 6,224,958 B1 | 5/2001 | Mahn, Jr. | |
| 6,244,958 B1 | 6/2001 | Acres | |
| 6,367,384 B1 | 4/2002 | Cass | |
| 6,503,569 B2 | 1/2003 | Sneddon | |
| 7,001,947 B2 | 2/2006 | Cordova | |
| 8,557,349 B2 * | 10/2013 | Uang | ......................... 427/412.1 |
| 2003/0087047 A1 | 5/2003 | Blauer | |
| 2005/0192378 A1 | 9/2005 | Uang | |
| 2010/0151132 A1 | 6/2010 | Uang | |
| 2010/0203091 A1 | 8/2010 | Uang | |
| 2010/0316803 A1 | 12/2010 | Uang | |

* cited by examiner

*Primary Examiner* — Patrick Niland
(74) *Attorney, Agent, or Firm* — Paul M. Denk

(57) ABSTRACT

A process of printing applies printing ink to the surface of a product of thermoplastic rubber compounds containing upwards of 95% mineral oil. The process uses ink compositions of resins, mineral oil, solvents, colorants, and additives. The process involves preparing a product from copolymer resins and other components, and blending an ink from copolymer resins and other components. Next, the process prints the desired multi-color image on the treated surface followed with a top coat on the surface of the substrate to protect the printed image. The top coat and ink stretch with the product so that the image remains intact. The process uses pad printing to print the image upon the surface of the product.

5 Claims, No Drawings

PRINTING INK COMPOSITION AND METHOD FOR PRINTING

CROSS REFERENCE TO RELATED APPLICATION

This continuation-in-part patent application claims priority to the continuation-in-part patent application having Ser. No. 12/657,302, filed on Jan. 19, 2010, now Publication No. US 2010-0151132 A1, which claims priority to the non-provisional patent application having Ser. No. 11/069,708, filed on Mar. 1, 2005, now abandoned, which claims priority to the provisional patent application having Ser. No. 60/548,990, filed on Mar. 1, 2004, and also claims priority to the non-provisional patent application having Ser. No. 12/456,215, filed on Jun. 12, 2009, now Publication No. US 2010-0316803 A1, which claims priority to the provisional patent application having Ser. No. 61/131,964, filed on Jun. 13, 2008.

TECHNICAL FIELD OF THE INVENTION

This invention relates to the composition of printing inks, particularly those that can be applied by pad printing for multicolor images. In this invention, the printing ink can be applied to the surface of a product such as the substrate of the thermoplastic rubber compound that contains styrenic block copolymer and mineral oil.

BACKGROUND FOR THE INVENTION

In recent years, more commercial thermoplastic rubber products have appeared in bikes, gifts, toys and the medical industry. Soft, stretchable, clear, transparent products in the area of amusement, imaginative play, and ornamentations are particularly attractive to consumers. However, thermoplastic rubber compounds containing mineral oil do not provide a good surface to achieve permanent marking by conventional printing methods such as pad printing, screen printing, or hot foiling. A soft thermoplastic rubber compound with hardness below 10 A makes it even more difficult. If the ink film's elasticity is lower than that of the substrate, the printed image will separate when stretched. In the prior art U.S. Pat. No. 3,519,466 to Akamatsu, et al. discloses a process for printing on molded articles of a thermoplastic resin or rubber. This process involves heating an ink containing a benzene-soluble reactive dye and a wetting agent soluble in benzene in contact with the surface of the molded article which contains an organo-metallic compound. When the article reaches a temperature higher than 50° C. but lower than the softening point of the article, the dye permeates the article and reacts with the organo-metallic compound to become fixed therein.

Then U.S. Pat. No. 6,367,384 to Cass, Donald W. reveals a process for printing a four color image directly onto a fishing lure. The process begins by preparing the soft bait fishing lure to receive the ink. By employing a four color pad printing machine the process prints a four color image on one side of the fishing lure and after optionally turning the lure over, prints on the other side. In the Cass process, all of the printing articles must be pretreated and a clear topcoat may optionally be applied to the lure.

The current available methods to apply images onto thermoplastic rubber compounds include hand painting or spraying. Since the composition of thermoplastic rubber compounds contains from about 60% to about 80% mineral oil by weight, ink film has extreme difficulty sticking to the surface of the substrate. The present invention solves these problems by using the pad printing process to apply an image to the surface of thermoplastic rubber compounds directly and to apply a topcoat that protects the applied image even when stretched.

SUMMARY OF THE INVENTION

The invention provides a durable and elastic ink image on the surface of a product, or substrate of thermoplastic rubber compounds. The printing process occurs upon a pad printing machine. The printing ink contains resins, pigments, solvents, hydrocarbon oils, and additives. Furthermore, the printing ink can have other interesting colors, and effects, such as fluorescent ink, glitter powder, thermochromic ink that glows in the dark. The thermoplastic rubber compounds, or other polymer compounds, that receive the printable ink may also include any thermoplastic rubber or polymer articles, as formed. Such articles can comprise either toys, housewares, or almost any type of item made of these compounds and formed into such articles.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting. Further objects and advantages of the subject invention will be apparent to those skilled in the art.

One object of the present invention is to provide printing ink composition and method with a formulation of varying components that produces a stretchable ink film on the surface or substrate of deformable thermoplastic rubber products.

Another object is to provide such a printing ink composition and method that remains upon a product of shapes including convex balls or flat sheets.

Another object is to provide such a printing ink composition and method that has a low cost of manufacturing so the purchasing people and organizations can readily buy the composition from warehouses and supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the descriptive matter in which there is illustrated a preferred embodiment of the invention.

DETAILED DESCRIPTION OF THE INVENTION

The present invention of pad printing ink applied on the substrate of thermoplastic rubber compound, includes resins, mineral oil, solvents, pigments, dyes, and additives. The process involves selecting a thermoplastic rubber compound for a product, printing multi-color image on the treated substrate of thermoplastic rubber compound, and applying a top coat upon the image. The transparent top coat can be applied by pad printing or spraying.

Resins

The printing ink of the present invention begins with one or more resins, obtained in the form of granules or powders. The resins must be dissolved in a suitable solvent or mixture of solvents. As a main component of the invention, the resins form the finished ink film and serve as the carrier for the coloring material used in the ink formulation. The selection and combination of the resins determine the utilization of the ink's area and the resulting properties: adhesion to various substrates, grades of gloss, and resistance. Under the present invention, varying the amount and types of polymers affects the features of pad printing ink. For example, preferably using triblock, radical block, multi-block copolymers, and optionally a diblock copolymer, the printing ink composition, which has desirable rheological properties, will produce a durable and stretchable ink film. The polymers used comprise at least one copolymer selected from the radical block and multi-block copolymers. This invention contains at least two thermodynamically incompatible segments, one hard and one soft. In general, in a triblock polymer, the ratio of the segments is one hard, one soft, and one hard or an A-B-A copolymer. The multiblock and radical block copolymer can contain any combination of hard and soft segments. In the optional diblock copolymer, the blocks are sequential with respect to hard and soft segments.

Commercially available thermoplastic rubber type polymers are especially useful in forming the compositions of the present invention. Kraton Chemical Company and Septon Company of America sell commonly used polymers. The most common structure is the linear ABA block type; styrene-butadiene-styrene (SBS) and styrene-isoprene-styrene (SIS) which is the Kraton D rubber series. Kraton G is another type of polymer. The copolymer comprises a styrene-ethylene-butylene-styrene (S-EB-S) structure. The Kraton G series is preferred in the practice of the invention. The optionally blended diblock polymers include the AB type such as styrene-ethylene-propylene (S-EP) and styrene-ethylene-butylene (S-EB), styrene-butadiene (SB) and styrene-isoprene (SI). Septon resins are available in either diblock (A-B) or the more common triblock (A-B-A) types. These include a hydrogenated poly-isoprene (S-EP, S-EP-S), a hydrogenated poly-isoprene/butadiene (S-EEP-S) polymer or a hydrogenated poly-butadiene (SEBS) polymer or styrene-ethylene-ethylene/propylene styrene (SEEPS). Depending on the hardness of the substrate of the thermoplastic rubber compositions of ink, employing various combinations of triblock and radical block is necessary.

The pad printing ink includes resins from about 1 to about 12% by weight, often from about 5 to about 10% by weight, and preferably from about 6 to about 8% by weight.

Mineral Oil

Mineral oils are highly refined, colorless, and odorless petroleum oils. A preferred mineral oil to mix with thermoplastic rubber compound of the invention is "white" mineral oil. This mineral oil is generally recognized as safe for contact with human skin. Mineral oil may be characterized in terms of its density and viscosity, where light mineral oil is relatively less viscous than heavy mineral oil.

Light mineral oils are preferred for use in the invention. Mineral oils are available commercially in both USP and NF grades. USP mineral oils have viscosities that range from 35 to 125 cSt and pour points that range from −12° C. to −20° C. NF light mineral oils have lower viscosities, typically 3-30 cSt, and pour points as low as −40° C. The mineral oil may be of technical grade, having a viscosity ranging from 4-90 cSt and a pour point ranging from −12° C. to 2° C. Examples of commercially available suitable mineral oils include Soneborn® and Carnation® white oils from Witco, Isopar® K and Isopar® H from ExxonMobil, and Drakeol®, Draketex®, Parol® white mineral oils from Penreco Company. The amount of mineral oil in the pad printing ink should range from about 10 to about 30% by weight based on the total weight of pad printing ink components, and preferably from about 15 to about 25% by weight.

Solvents

Solvents differ in their evaporation rates and strengths. The amount of solvent in a pad printing ink is a major factor for its drying rate, printing speed and adhesion to a substrate. Solvents include thinners and retarders. Retarders are necessary when printing speed is slow and when drying ink system is extremely fast. Functioning as diluents in the corresponding ink system, thinners are a mixture of solvents. Mixing ink with thinners in the correct ratio to achieve the desired viscosity is extremely important. The viscosity of the final mixture determines the effectiveness of the ink transfer. The selection and amount of solvents depends on the resins and pigment used in the ink system. In some cases, the substrates also determine which solvent should be used. The physical evaporation of the solvents in the ink of the present invention induces the drying of ink on substrate. At the same time, the substrate of thermoplastic rubber compound is partially dissolved, thus the slight dissolution of the printing surface results in a direct bond between the ink and the substrate. In the present invention, the top coat uses aromatic solvents to increase the adhesion between the ink film and the substrate of thermoplastic rubber and very low evaporation rate of glycol ether acetate are used to reduce the volatile of aromatic solvents.

The solvents uses in this invention can be arranged in the following chemical groups: Aromatic Hydrocarbon, Ester, Glycol Ether Acetate and Ketone. Aromatic solvents include Toluene, Xylenes, Aromatic 100, and Aromatic 150. The Ester group includes isopropyl acetate and amyl acetate. The Glycol Ether Acetate group also includes propylene glycol methyl ether acetate, ethylene glycol monoethyl ether acetate and ethylene glycol monobutyl ether acetate. And, cyclohexanone, diacetone alcohol, and isophorone are members of the Ketone group.

For this invention, preferred printing ink composition includes a combination of Aromatic Hydrocarbon, Glycol Ether Acetate and Ketone solvents. The pad printing ink includes solvents from about 30 to about 80% by weight, more preferably from about 45 to about 70% by weight.

Colorants

Colorants provide the color tone of the ink and determine its hiding power. Colorants, either organic pigments or inorganic pigments, give color to a substrate by altering its reflective characteristics. Pigment comes in hundreds of different hues and sources. Pigments come from nature in mineral or vegetable forms, but most are synthetic materials. When ink is applied to a substrate, colorants either remain on the surface or have a tendency to fill voids in irregular surfaces. The present invention contains a coloring agent that produces a desired color appearance. For this invention, organic pigments are preferred, suitable for use in printing inks. Examples of such pigments include, but are not limited to, pigment yellow 83 (C.I. 21108), pigment orange 34 (C.I. 21115), pigment red 48:3 (C.I. 15865:3), pigment violet 23 (C.I. 51319), pigment blue 15:2 (C.I. 74160), pigment green 7 (C.I. 74260), pigment white 6 (C.I. 77891), and pigment 7 (C.I. 77266). In this invention, pigments include about 10 to 30% by weight, preferably in an amount of about 15 to about 25% by weight. The abbreviation C.I. stands for color index produced by the Society of Dyers and Colorists in West Yorkshire, England incorporated herein by reference.

Additives

The additives, used in small quantities, adjust the ink properties, such as flow, viscosity, or characteristic of the surface. Adhesion modifiers, matting powder, anti-foam agent, wetting agent, antioxidant, antistatic agents, and flow control agents are a few examples. However, solvents have the most profound effect on printing performance.

An adhesion modifier includes 100-VR-1260 Adhesion Modifier from RUCO Druckfarben GmBH of Eppstein Germany. A matting powder includes AceMatt 412 from JCC Chemical Trading Co. Ltd. of Guanzhou China.

In the preferred embodiment, the flow control agent may comprise Dapro® S-65, available from Elementis Specialties, or polyether modified polydimethylsiloxane such as BYK-307, available from BYK-Chemie USA.

An antioxidant that can be used includes pentaerythrityl tetra-di-t-butyl hydroxyhydrocinnamate Tinogard® TT, from Ciba® Specialty Chemicals.

Examples of a wetting agent, which provides for better mixing of the various components of the composition, include dioctyl sodium sulfosuccinate Aerosol® OT-S, from Cytec Industry and polyether modified siloxane BYK-345 from BYK-Chemie USA.

An example of an anti-foaming agent, to keep the composition in a more liquid stage during mixing and to prevent the generation of any aeration in it, for better flow and application, is alkylmethyl siloxane Additive 56, from Dow Corning or polysiloxanes and hydrophobic solids in polyglycol BYK-022, from BYK-Chemie USA.

An example of an anti-static agent is alkylamine ethoxylate Atmer 163, available from Uniqema.

Coating of Thermoplastic Rubber Substrate

Normally, pad printing lays down a very thin ink film ranging from 4 to 6 microns thick. A top coat plays an important role: forming a stretchable film that seals the printed image upon a rubber like substrate and prevents scratches from accumulating in the top coat or upon the image beneath. If the printed image needs better protection on the finish product, then another treatment of a top coat can be used. The compositions of a transparent top coat include resins, mineral oil, additives and solvents as described previously. The selection of polymers in the top coat is the same as those in printing ink composition as previously described under resins. The content of resins in the top coat ranges from about 5 to about 30% by weight, often from about 10 to about 25% by weight, and preferably from about 15 to about 20% by weight. It is necessary to use retarding solvents for topcoat. The present invention has preferred compositions employing a combination of aromatic solvents. The top coat should include solvent from about 35 to about 90% by weight, often from about 50 to about 80% by weight, and ideally from about 60 to about 70% by weight. The solvent makes the surface of the product irregular by partially dissolving the substrate of thermoplastic rubber. Mineral oil, as a component of the top coat, functions as a retarder to prevent shrinkage or dissolution of the substrate due to the depth etching on the surface. The mineral oil is present in amounts ranging from about 5 to about 30% by weight, preferably from about 10 to about 20% by weight.

Example

A multicolor pad-printing machine is used to print an image onto the thermoplastic rubber of various products, which contain up to 80% mineral oil.

The surface shapes of the thermoplastic rubber products can be smoothing convex such as a ball, solid 3-D design features, and flat sheets. The content of the ball can be one of mixtures of ingredients such as water, gel, thermochromic pigment, fluorescent pigment, and the like. For example, in a three-color pad printing of a logo onto the surface of ball products or flat products, the printing process repeats four times: three different colors of ink and one clear topcoat. The top coat is preferably applied by pad printing, alternatively, by spraying. The method of applying the top coating should be selected based on the shape of the final products.

Further Examples

A further example of the process of application of this particular invention includes applying at least one color image to an elastic surface of a thermoplastic rubber or polymer compound formed into a toy, ball, household item, sheet or film, and which have a flexible and resilient surface structure receptive to at least one applied printing ink, said process comprising: selecting the compound from one of a polymer and rubber elastomer and thermoplastic rubber compounds; applying a printing ink by screen printing to said compounds, said printing ink including: resins selected from the group consisting of diblock copolymer, triblock copolymer, radical block copolymer, and multi-block copolymer, included in an amount of between 1% to 30% by weight of said composiiton; mineral oil between about 1% to about 30% by weight of said composition; at least one solvent between about 30% to about 80% by weight of said composition, having one of aromatic hydrocarbon, ester, glycol ether acetate and ketone; at least one colorant between about 5% to about 60% by weight of said composition, having at least one of an organic pigment, an inorganic pigment, a luminescent pigment, a florescent pigment, and a thermochromatic pigment; and an adhesive to adjust the application characteristic of the printing ink, and to maintain its structural integrity after printing upon the surface of the thermoplastic rubber compound even as it is stretched, said additive being selected from the group consisting of an adhesion modifier, matting powder, antistatic agent, antifoaming agent, wetting agent, antioxidant, a flow control agent, and a fragrance; and said printing ink resins contain at least two thermodynamically incompatible segments selected from the group consisting of styrene-butadiene-styrene, styrene-isoprene-styrene, styrene-ethylene-butadiene-styrene, styrene-ethylene-propylene-styrene, styrene-butadiene polymers, and styrene-isoprene polymers; said printing ink composition resins comprise between about 1% to about 30% by weight of said composition; applying a top coat transparent treatment to the surface of said compound following said applying a printing ink, said top coat treatment having one or more copolymer resins selected from the group consisting of diblock copolymer, triblock copolymer, radical block copolymer, and multi-block copolymer; said top coat treatment having mineral oil, and at least one solvent, wherein each of said copolymers resins contains at least one of a thermodynamically incompatible segments selected from the group consisting of styrene-butadiene-styrene, styrene-isoprene-styrene, styrene-ethylene-butadiene-styrene, styrene-ethylene-propylene-styrene, and styrene-ethylene-butadiene-styrene, and said resins being between about 1% to about 30% by weight of said top coat treatment; wherein said top coat treatment forms a stretch film sealing said printed image to said compound and preventing said image from peeling off said surface and scratching of said surface; and, wherein the image remains intact upon the surface of the compound when stretched.

A further example of the process of this invention, for applying a printing ink composition to an elastic surface, includes applying at least one color image to an elastic surface of a thermoplastic rubber or polymer compound formed into a toy, ball, household item, sheet or film article, which have a flexible and resilient surface structure receptive to at least one applied printing ink, comprising: selecting the compound from one of a polymer and rubber elastomer and thermoplastic rubber compounds, and including about 1% to about 95% by weight of mineral oil; applying a printing ink composition to the elastic surface of the formed article, said printing ink composition comprising: at least one styrenic copolymer resin selected from the group consisting of diblock copolymer, triblock copolymer, radical block copolymer, and multi-block copolymers, said styrenic copolymer resin included in approximately 1% to 30% by weight of the printing ink composition, and selected from the group consisting of styrene-butadine rubber, styrene-butadine-styrene, and styrene-ethylene-butadine-styrene; and including mineral oil within the printing ink composition of between about 1% to about 30% by weight of said composition; including solvents between about 30% to about 80% by weight of said composition, said solvents being at least one of an aromatic hydrocarbon, ester, glycol ester acetate, and ketone; including at least one colorant between about 5% to about 60% by weight of the printing ink composition, said colorant including at least one of an organic pigment, an inorganic pigment, a luminescent pigment, a florescent pigment, and thermochromatic pigment; an additive to adjust the application characteristic of the printing ink, and to maintain its structural integrity after printing upon the surface of the thermoplastic rubber or polymer compound even as it is stretched, said additive being at least one of: an adhesion modifier, a flow control agent comprising polyether modified polydimethylsiloxane, an antioxidant comprising pentaerythrityl tetra-di-t-butyl hydroxyhydrocinnamate, a wetting agent comprising one of dioctyl sodium sulfosuccinate and polyether modified siloxane, an antifoaming agent comprising one of alkylmethyl siloxane, polysiloxanes, and hydrophobic solids in polyglycol, and an antistatic agent comprising alkylamine ethoxylate.

It is likely that a topcoat is also applicable to furnish a coating, as a transparent topcoat to the surface of the compound. The application of the transparent topcoat to the surface of the compound is done after the applying said printing ink composition, with said topcoat being applied as a film in the range of about 0.01 to 10 millimeters.

From the aforementioned description, a printing ink composition and method have been described. The printing ink composition is uniquely capable of stretching with a thermoplastic product so that an ink image remains intact as the product stretches. The printing ink composition and method and its various components may be manufactured from many materials as previously described.

As such, those skilled in the art will appreciate that the conception, upon which this disclosure is based, may readily be utilized as a basis for the designing of other compositions, methods and systems for carrying out the several purposes of the present invention. Therefore, the claims include such equivalent constructions insofar as they do not depart from the spirit and the scope of the present invention.

I claim:

1. A process for applying at least one color image to an elastic surface of a thermoplastic rubber or polymer compound formed into a toy, ball, household item, sheet or film, and which have a flexible and resilient surface structure receptive to at least one applied printing ink, said process comprising:

(A) selecting the compound from one of a polymer and rubber elastomer and thermoplastic rubber compounds;

(B) applying a printing ink by screen printing to said compounds, said printing ink including:
   resins selected from the group consisting of diblock copolymer, triblock copolymer, radical block copolymer, and multi-block copolymer, included in an amount of between about 1% to 30% by weight of said composition;
   mineral oil between about 1% to about 30% by weight of said composition;
   at least one solvent between about 30% to about 80% by weight of said composition, having one of aromatic hydrocarbon, ester, glycol ether acetate and ketone;
   at least one colorant between about 5% to about 60% by weight of said composition, having at least one of an organic pigment, an inorganic pigment, a luminescent pigment, a florescent pigment, and a thermochromatic pigment; and
   an additive to adjust the application characteristic of the printing ink, and to maintain its structural integrity after printing upon the surface of the thermoplastic rubber compound even as it is stretched, said additive being selected from the group consisting of an adhesion modifier, matting powder, antistatic agent, antifoaming agent, wetting agent, antioxidant, a flow control agent, and a fragrance; and
   said printing ink resins contain at least two thermodynamically incompatible segments selected from the group consisting of styrene-butadiene-styrene, styrene-isoprene-styrene, styrene-ethylene-butadiene-styrene, styrene-ethylene-propylene-styrene, styrene-butadiene polymers, and styrene-isoprene polymers;
   said printing ink composition resins comprise between about 1% to about 30% by weight of said composition;

(C) applying a top coat transparent treatment to the surface of said compound following said applying a printing ink,
   said top coat treatment having one or more copolymer resins selected from the group consisting of diblock copolymer, triblock copolymer, radical block copolymer, and multi-block copolymer;
   said top coat treatment having mineral oil, and at least one solvent,
   wherein each of said copolymers resins contains at least one of a thermodynamically incompatible segments selected from the group consisting of styrene-butadiene-styrene, styrene-isoprene-styrene, styrene-ethylene-butadiene-styrene, styrene-ethylene-propylene-styrene, and styrene-ethylene-butadiene-styrene, and said resins being between about 1% to about 30% by weight of said top coat treatment;
   wherein said top coat treatment forms a stretch film sealing said printed image to said compound and preventing said image from peeling off said surface and scratching of said surface; and,
   wherein the image remains intact upon the surface of the compound when stretched.

2. A process for applying at least one color image to an elastic surface of a thermoplastic rubber or polymer compound formed into a toy, ball, household item, sheet or film article, which have a flexible and resilient surface structure receptive to at least one applied printing ink, comprising:

(A) selecting the compound from one of a polymer and rubber elastomer and thermoplastic rubber compounds, and including about 1% to about 95% by weight of mineral oil;

(B) applying a printing ink composition to the elastic surface of the formed article, said printing ink composition comprising:

at least one styrenic copolymer resin selected from the group consisting of diblock copolymer, triblock copolymer, radical block copolymer, and multi-block copolymers, said styrenic copolymer resin included in approximately 1% to 30% by weight of the printing ink composition, and selected from the group consisting of styrene-butadine rubber, styrene-butadine-styrene, and styrene-ethylene-butadine-styrene; and including mineral oil within the printing ink composition of between about 1% to about 30% by weight of said composition;

including solvents between about 30% to about 80% by weight of said composition, said solvents being at least one of an aromatic hydrocarbon, ester, glycol ester acetate, and ketone;

including at least one colorant between about 5% to about 60% by weight of the printing ink composition, said colorant including at least one of an organic pigment, an inorganic pigment, a luminescent pigment, a florescent pigment, and thermochromatic pigment;

an additive to adjust the application characteristic of the printing ink, and to maintain its structural integrity after printing upon the surface of the thermoplastic rubber or polymer compound even as it is stretched, said additive being at least one of:

an adhesion modifier, a flow control agent comprising polyether modified polydimethylsiloxane, an antioxidant comprising pentaerythrityl tetra-di-t-butyl hydroxyhydrocinnamate, a wetting agent comprising one of dioctyl sodium sulfosuccinate and polyether modified siloxane, an antifoaming agent comprising one of alkylmethyl siloxane, polysiloxanes, and hydrophobic solids in polyglycol, and an antistatic agent comprising alkylamine ethoxylate.

3. The process for applying at least one color image to an elastic surface of a thermoplastic rubber or polymer compound, including:

applying a transparent top coat to the surface of said compound after applying said printing ink composition, said top coat being applied as a film ranging from 0.01 to 10 millimeters thick, said top coat having at least one styrenic copolymer resin applied in an approximate amount of 1% to about 30% by weight of the top coat, and said resin selected from the group consisting of styrene-butadiene-styrene polymers, styrene-ethylene-propylene polymer, styrene-ethylene-butadiene-styrene polymers, styrene-ethylene-ethylene/propylene-styrene polymers, said top coat including mineral oil being between 1% to about 30% by weight of said top coat, said top coat including at least one solvent being between about 30% to about 80% by weight of said top coat composition, and including one of aromatic hydrocarbon, ester, glycol ether acetate and ketone, and wherein said top coat forms a stretch film sealing said printed image to said compound and preventing said image from peeling off said surface when scratching of said surface occurs; and wherein the applied image remains intact upon the surface of the compound when stretched.

4. The process of claim 2 wherein said top coating is applied by one of screen printing, pad printing, or spraying onto the surface of said compound.

5. The process of claim 2 wherein said printing ink is applied by pad printing onto the surface structure of the thermoplastic or polymer compound.

* * * * *